United States Patent [19]

Charrier

[11] 4,394,771
[45] Jul. 19, 1983

[54] APPARATUS FOR MOVING FILM CASSETTES

[76] Inventor: Pierre Charrier, 5520 Grande-Prairie, St. Léonard, Quebec, Canada

[21] Appl. No.: 250,034

[22] Filed: Apr. 1, 1981

[51] Int. Cl.³ .............................................. G03B 41/16
[52] U.S. Cl. ...................................... 378/172; 378/210
[58] Field of Search ................................ 378/172, 173

[56] References Cited
U.S. PATENT DOCUMENTS

| | | | |
|---|---|---|---|
| 1,698,895 | 1/1929 | Stephenson | 378/172 |
| 2,277,330 | 3/1942 | Kizaur | 378/172 |
| 2,999,159 | 9/1961 | Curry | 378/172 |

FOREIGN PATENT DOCUMENTS 570217  2/1959  Canada .

Primary Examiner—Craig E. Church
Attorney, Agent, or Firm—Thierry Orlhac

[57] ABSTRACT

A compact apparatus for moving a set of X-ray films or film cassettes past a picture-taking station. The apparatus comprises a plurality of holders impervious to X-rays onto each of which are mounted two films in back-to-back relation. The holders are moved in a closed loop past a picture-taking station where they present one of their two films for a first picture. After exposure, the holders are moved through the loop a second time during which they are rotated through 180° so as to present the other films they carry at the station for a second picture.

5 Claims, 9 Drawing Figures

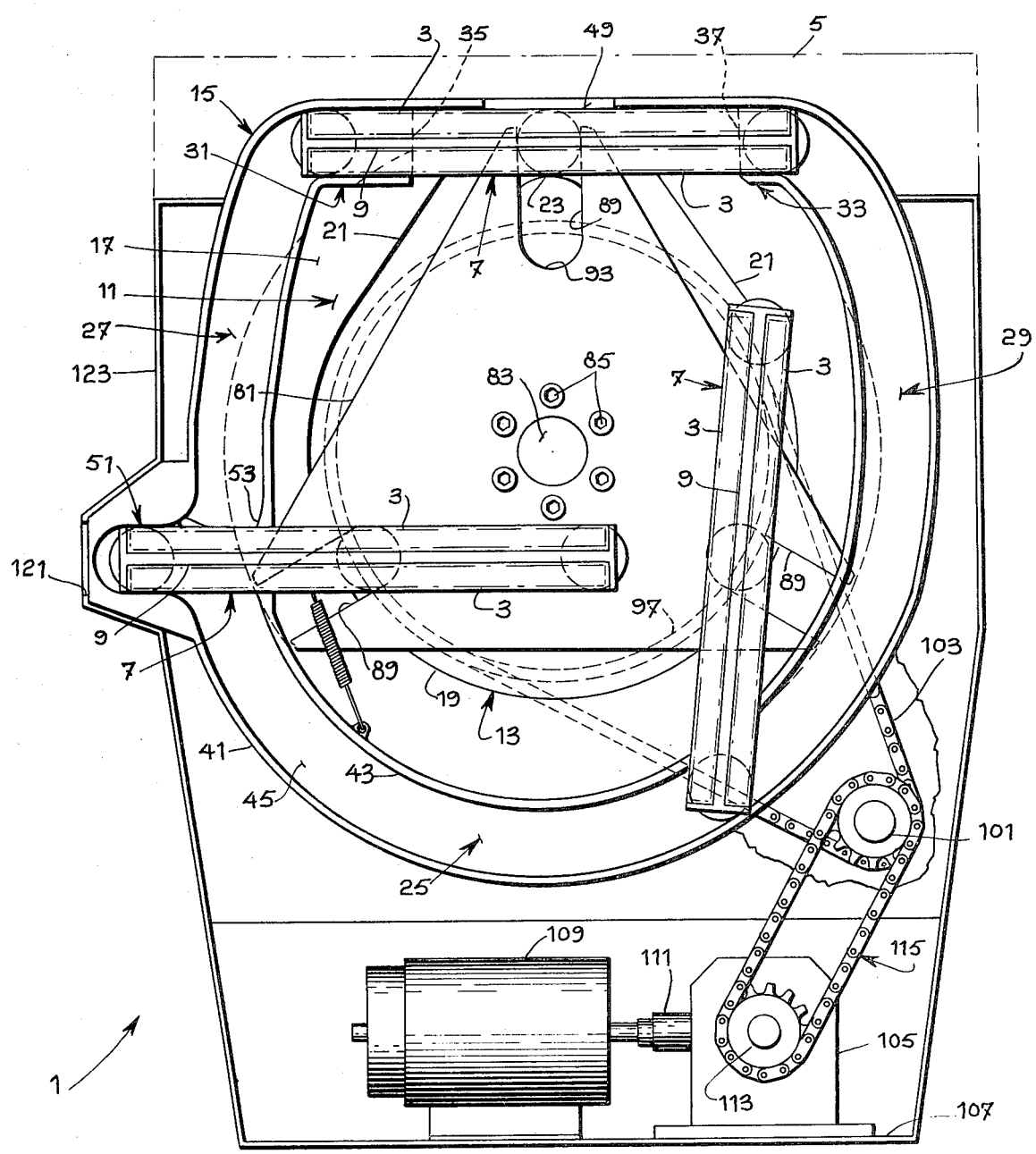

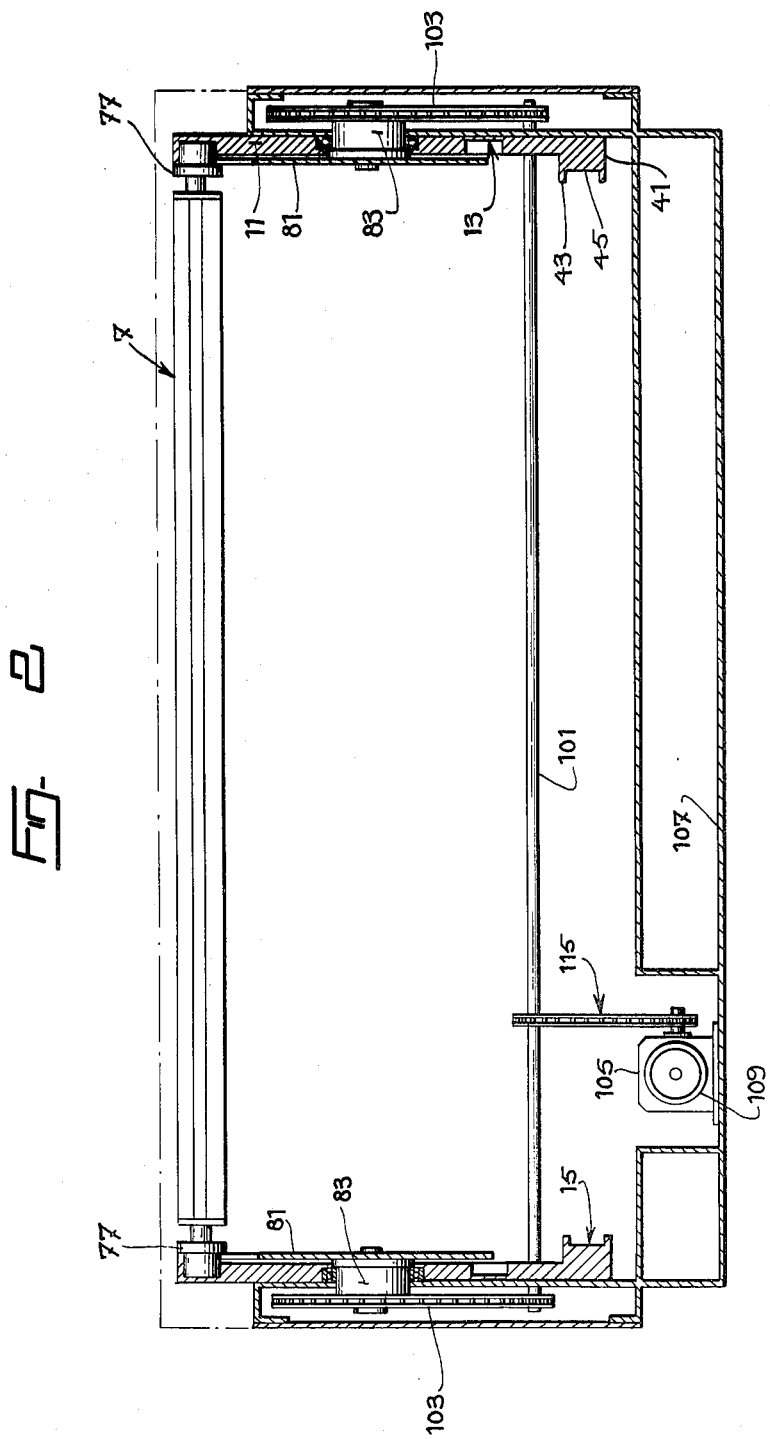

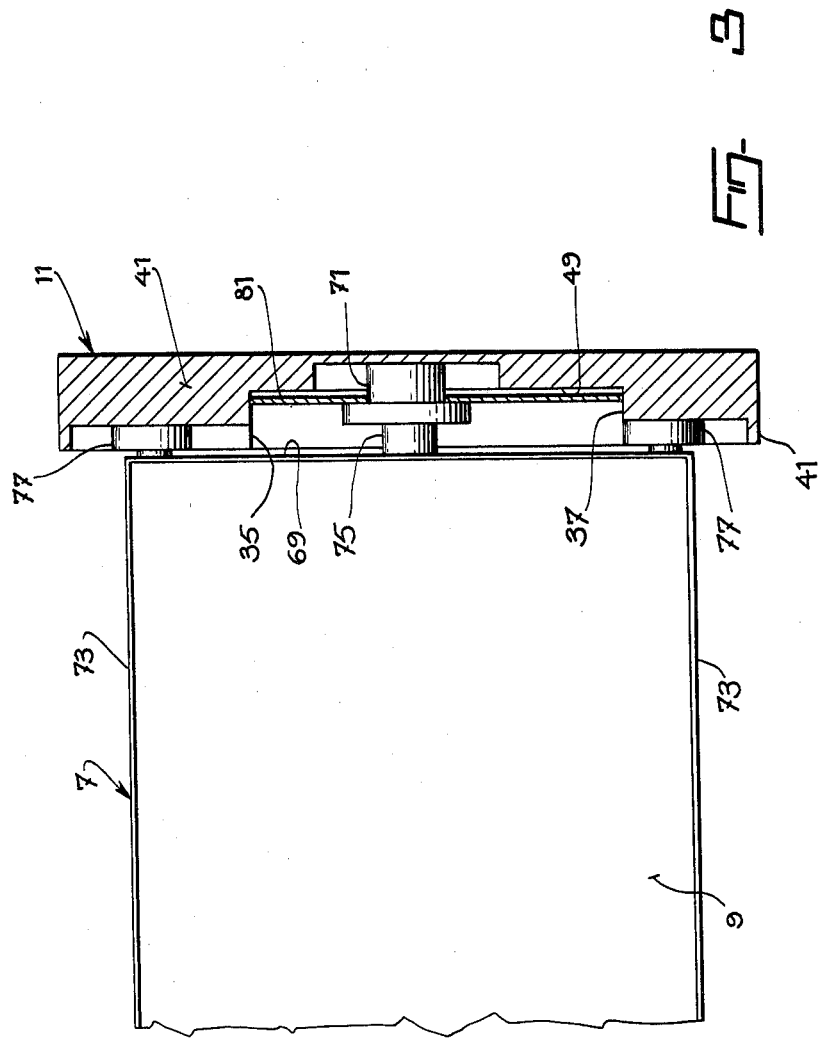

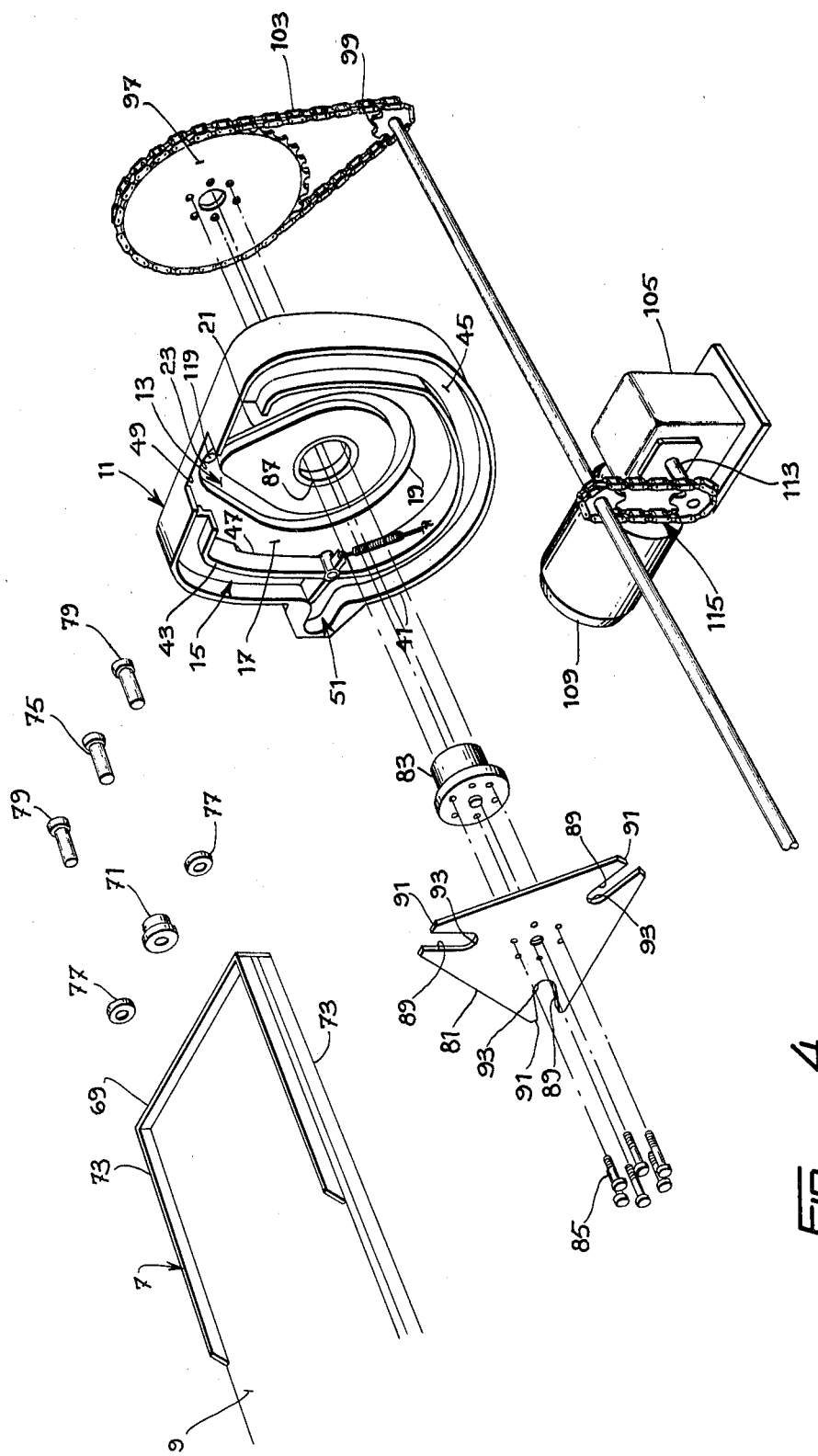

APPARATUS FOR MOVING FILM CASSETTES

The present invention relates to an apparatus for use in taking X-ray pictures.

The invention more particularly relates to an apparatus for handling a set of large X-ray films to present the films in a particular sequence to an X-ray picture-taking station in taking a series of pictures.

Machines to take a series of large X-ray pictures of a human patient are known. The series of pictures are taken at different "depths" or levels of a portion of the person's body such as the thorax. The machine, commonly known as "serialograph", includes a horizontal support for a patient and an apparatus beneath the support for holding the films and presenting them one at a time to a picture taking station adjacent the patient. The films are usually loaded in cassettes and the cassettes are intermittently moved in a closed loop past the picture-taking station as shown in U.S. Pat. Nos. 2,999,159 or 4,104,529 by way of example. As each cassette is moved into position, the focus of an X-ray source above the patient support is slightly changed to obtain the set of pictures taken at different depths.

As aforesaid, the films, or film cassettes, used in this field are relatively large. To form a closed loop of the large cassettes requires a structure that is also relatively large in size. The structure needed to hold and rotate the cassettes in a closed loop is often substantially wider than the patient support and this can make it awkward and difficult for a doctor or technician to reach and properly adjust and/or position the patient for taking the X-rays.

To solve this problem, it has already been proposed in U.S. Pat. No. 2,277,330 to use a cassette holder adapted to hold two cassettes. A holder reversing mechanism presents one cassette and then the other of the pair to an opening for X-ray exposure. However, the mechanism disclosed in this patent can be used for rotating one cassette holder only, which of course substantially restricts the use of the apparatus in serialography.

It is the object of the present invention to provide an improved apparatus for handling a plurality of, films or film cassettes which is much more compact in size as compared to known apparatus, and can have, for example, a width substantially equal to the width of the patient support, thereby making it much easier to reach and adjust the patient.

The film handling apparatus according to the present invention employs film or cassette holders, the holders forming a closed loop. Each holder holds two films or film cassettes in back-to-back relationship. Thus only half the number of holders are required as compared to the number of cassettes handled. The smaller number of holders means that a smaller trabel loop can be formed which in turn reduces the size of the apparatus needed to move the holders carrying the cassettes. To be properly employed, the holders are rotated twice instead of once through the closed loop, each holder presenting the film on one of its sides for exposure during the first loop, and then presenting the other film on the other side for exposure during the second loop.

The invention is particularly directed toward an apparatus for use in taking X-ray pictures, which apparatus has a plurality of X-ray film holders, each holder being adapted to hold two X-ray films in back-to-back relation. The apparatus has means for intermittently rotating the holders in a closed loop past a picture-taking station on the loop, with each holder stopping at the station during the time a picture is taken and presenting one of its two films for a picture as it first passes the station. Means ratate each holder through 180° after its first passage at the station to have the holder present its other film to the station during a second passage at the station.

A preferred embodiment of the invention will now be described in detail having reference to the accompanying drawings in which:

FIG. 1 is a cross-section view of an apparatus according to the invention;

FIG. 2 is a side view of the apparatus, in partial section;

FIG. 3 is a partial plan view showing details at one end of the apparatus:

FIG. 4 is an exploded view of one end of the apparatus; and

FIGS. 5a to 5e are an end view of the apparatus showing one cassette holder in different stages of movement.

Figure 5A:
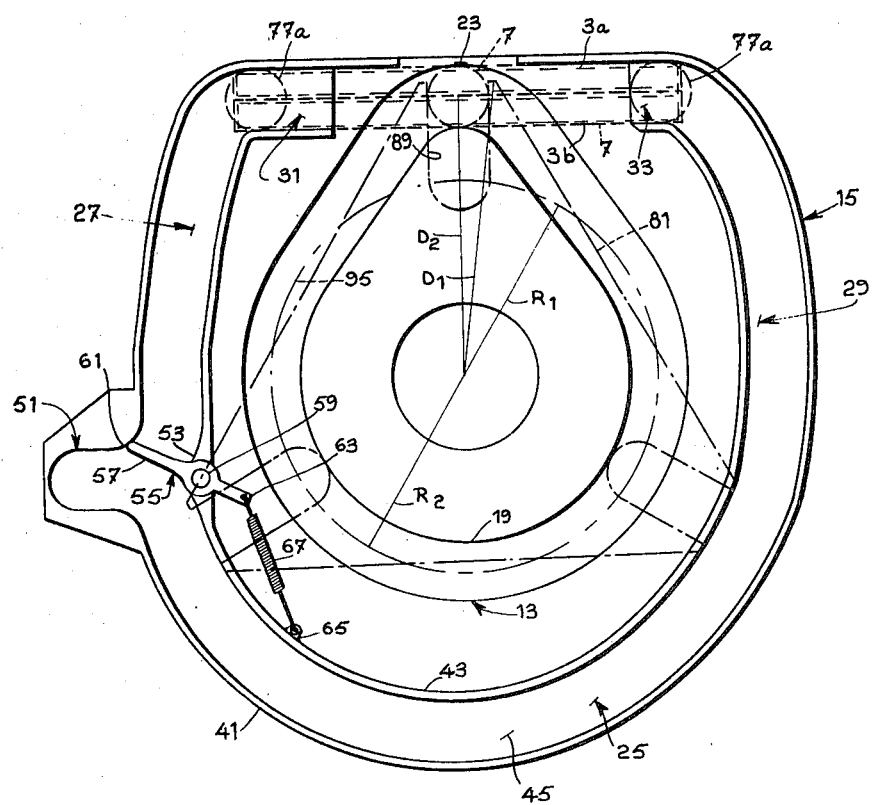
Figure 8B:
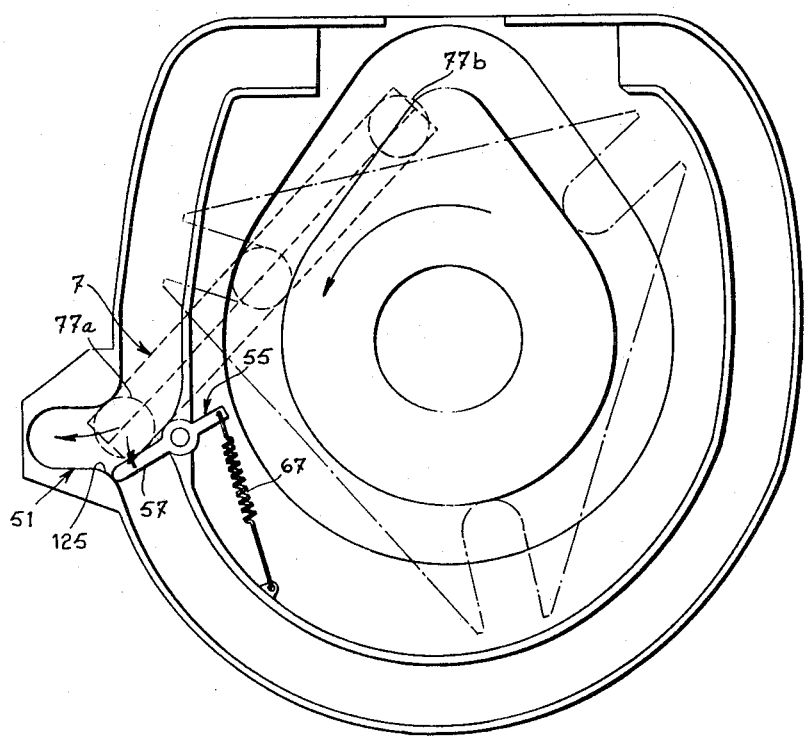

The film handling apparatus 1 as shown in FIG. 1 is designed to have a set of films or film cassettes 3 in a specific sequence past a surface 5 against which a subject to be X-rayed is positioned. The apparatus 1 shown is designed to move six cassettes 3 although more or less cassettes, in multiples of two, can be similarly moved.

The apparatus 1 employs three holders 7 for the six cassettes 3. Each holder 7 is adapted to detachably hold, by suitable means which are not shown, two cassettes 3 in back-to-back relationship separated by a support plate 9. The support plate 9 has a generally rectangular shape and is made of X-ray impermeable material so that when the film cassette on one side of the plate 9 is being exposed, the film cassette on the opposite side of the plate is not affected.

The holders 7 are adapted to be mounted for movement between two end support members 11. Each end support member 11 is fixedly mounted on the frame (not shown) of the apparatus. The support members 11 are mounted at the ends of the apparatus and face each other. Each end support member 11 has means defining a first, inner guide path 13 and a second, outer guide path 15 for use in moving the holders 7 as shown if FIG. 4. The first huide path 13 is a closed loop formed by a groove in the end wall 17 of the support member. The groove is on the inner surface of the end wall 17 and is generally pear shaped having a part circular lower portion 19 and an inverted, V-shaped, upper portion 21. The peak 23 of the upper portion 21 is closest to the surface 5 and defines the picture taking station on the first guide path 13.

The second, outer guide path 15 is an open loop. This second path 15 generally surrounds the first path 13 and is located slightly inwardly from the first path. The second path 15 is generally U-shaped with a part circular lower portion 25 and a pair of upwardly extending legs 27, 29. The upper ends 31, 33 of legs 27, 29 respectively are bent inwardly to face each other and define, respectively, an entry 35 to, and an exit 37 from, path 15. The entry 35, exit 37, and the picture taking station 23 on path 13 are in the same plane with the station 23 roughly centred between them. The second path 15 is formed by an outer wall 41 extending up from the end wall 17 of support member 11 and an inner wall 43 extending up from a bottom wall 45. The bottom wall 45 is fixed to outer wall 41 and extends transversely therefrom, parallel to end wall 17 but spaced from it to form a gap 47 between them. Inner wall 43 is parallel to outer wall 41. The outer wall 41 preferably encircles the end wall 17 with a notch 49 cut out of its position adjacent the picture taking station 23.

In that portion of guide path 15 where leg 27 joins lower portion 25, a short, outwardly directed branch 51 of path 15 is provided. The outer side wall 41, and bottom wall 41, and bottom wall 45 are shaped accordingly to provide this lateral branch path 51 which has the same width as path 15 and which merges smoothly with path 15. The inner wall 43 of path 15, adjacent branch path 51 is shaped to slightly point in toward the path 51 as shown at 53 in FIG. 5a. A gate member 55 is provided adjacent branch path 51. The gate member 55 can comprise an arm 57 pivotally attached by a pin 59 intermediate its ends, to the inner wall 43 opposite branch path 51. The arm 57 is long enough to have one end 61 just touch that portion of outer side wall 41 where branch 51 joins the side leg 27 of path 15. The other end 63 of arm 57 is connected to a point 65 on inner side wall 43, spaced along the lower portion 25 of path 15 from branch 51, by a tension spring 67. The branch path 51, and the gate member 55 help to rotate each holder 180 about its own axis as each holder moves one in a closed loop as will be described below.

Each holder 7 is provided with three guide rollers at each end 69 of the holder. One roller 71 is provided in the middle of each end 69, midway between sides 73 of holder 7. Roller 71 is mounted to holder 7 at each end by an axle pin 75. Roller 71 fits snugly within the groove defining the first guide path 13. Two rollers 77 are also provided at each holder end 69, one adjacent each side 73 of the holder. The rollers 77 are mounted to holder 7 by axle pins 79. Rollers 77 fit snugly into the second guide path 15 between walls 41, 43. At all times, roller 71 rides in path 13, at least one of rollers 77 rides in path 15.

Means are provided for moving the holders 7, supported between the end supports 11, in a closed loop past the picture taking station 23. The moving means include a ratatable dog plate 81 mounted adjacent the inner surface of the end wall 17 of each end support 11. The dog plate 81 is fixed at its center to a shaft 83 by bolts 85. The shaft 83 is snugly, rotably mounted in an opening 87 in end support 11. Opening 87 is centered with respect to the circular part of the two guide paths 13, 15. The dog plate 81 has the general shape of an equilateral triangle. A short slot 89 extends radially in toward the center of the plate from each of the three corners 91 of the dog plate 81. Each slot 89 has a width equal to the width of the first guide path 13. The bottom 93 of each slot 89 is simi-circular in shape. An imaginary circle 95 joining the centers of radius of the bottoms 93 of each slot 89 has the same radius R1 as the radius R2 defining the center of the bottom portion 19 of the first guide path 13. The outermost portion of each slot 89 must be located a distance D1 from the center of rotation of the dog which distance is greater than the distance D2 to the center of the picture taking station 23 from the center of the dog. Each slot 89 in dog plate 81 receives the middle roller 71 of one of the holders 7.

The dog plate 81 is rotated in the gap 47 between the end wall 17 of end support 11 and the bottom wall 45 of the second guide path 15. Suitable means are provided for rotating the dog plate 81 and the holders 7 which it carries by way of its slots 89. These means as shown in FIGS. 12 and 4, can comprise a large sprocket 97 fixed to the shaft 83 adjacent the outer surface of each end support 11. A second small sprocket 99 is fixed to each end of a drive shaft 101 which is rotatably mounted on the frame of the apparatus beneath, and to one side, of the end supports 11. A chain 103 connects sprockets 97, 99. A gear reducer 105 is mounted on the floor 107 of the apparatus beneath shaft 101. A motor 109 is connected to the input 111 of the gear reducer 105 and the output 113 of the gear reducer 105 is connected to shaft 101 via a chain and sprocket drive 115.

The holders 7 are mounted one at a time, and without their center rollers 71, between the end supports 11 by slipping them through the notches 49 cut in outer wall 41 and placing their outer rollers 77 in outer guide path 15 through the entry and exit ends 35, 37. With each holder 7 generally horizontal at the top of the second guide path 15 and centered with respect to the picture taking station 23 of the first guise path 13, the middle roller 71 at each end is attached, via its axle 75 to the holder 7 through a hole 119 in the end support 11 at the station 23. At the same time, the roller 71 is passed into a slot 89 in the dog plate 81. After each holder 7 is installed, the dog plate 11 is rotated through 120° to be in position to receive the next holder 7.

Means are provided for loading film cassettes 3 onto each holder 7. An elongated opening 121, as shown in FIG. 1, can be provided in the housing 123 of the apparatus adjacent the branch guide path 51. At this location, each holder 7 is substantially horizontal, during its movement in a closed loop, and a cassette 3 can be moved through slot 121 onto the top of holder 7 and fastened thereto by suitable means. Each holder 7 is loaded on one side and as each holder 7 arrives at slot 121 for a second time the holder 7 is now inverted and a second cassette can be loaded on the opposite side of holder, back to back with the first cassette.

Figure 5C:
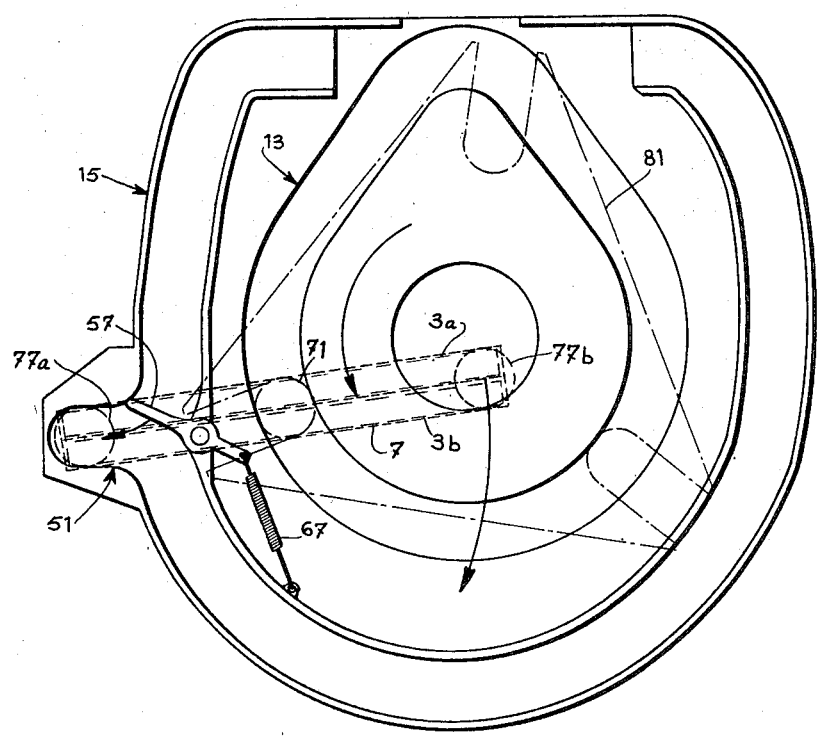

In operation, when the three holders 7 are each loaded with two cassettes 3, each holder 7 is rotated in a closed loop twice about the axis of rotation of center shaft 83 by rotation of dog plate 81. In addition, each holder 7 is rotated once through 180 about its own axis during each rotation about the central axis using branch path 51, and gate member 55. This is more clearly shown in FIG. 5 where the movement of one holder 7 is shown. In FIG. 5a, the holder 7 is shown in picture taking position, substantially parallel to the surface 5, with its center roller 71 at each end 69 at the picture taking station 23 in first guide path 13 an with its two outer rollers 77 at each end 69 in the upper bent ends 31, 33 of the legs 27, 29 of the second guide path 15. In this position, the roller 71 is held by slot 89 of dog plate 81 in the outer portion of the slot, when the film cassette 3a on the side of holder 7 facing surface 5 has been exposed, the dog plate 81 is then rotated through approximately 120° by the chain and sprocket drives moving holder 7, via its roller 71, counter clockwise to a loading station opposite the loading slot 121. As the holder 7 is rotated, the leading outer roller 66a moves down leg 27 to gate member 55 and the trailing outer roller 77b moves out of the second guide path 15 as shown in FIG. 5. As the leading roller 77a is moved against the gate member 55 it pushes the gate member 55 down, against spring 67 to bear against the corner 125 joining branch path 51 with the lower portion 25 of path 15. The gate member then deflects lead roller 77a into branch while continued movement of the dog plate 81 bring center roller 71 opposite the branch path and swings the trailing roller 77b down as shown in FIG. 5c. As lead roller 77a moves to the end of the branch path 51, spring 67 returns arm 57 to its initial position. When the dog plate 81 has moved through 120°, the support 7 is generally horizontally at the loading station and exposed film cassette 3a can be removed and replaced with another cassette 3a'.

Figure 5D:
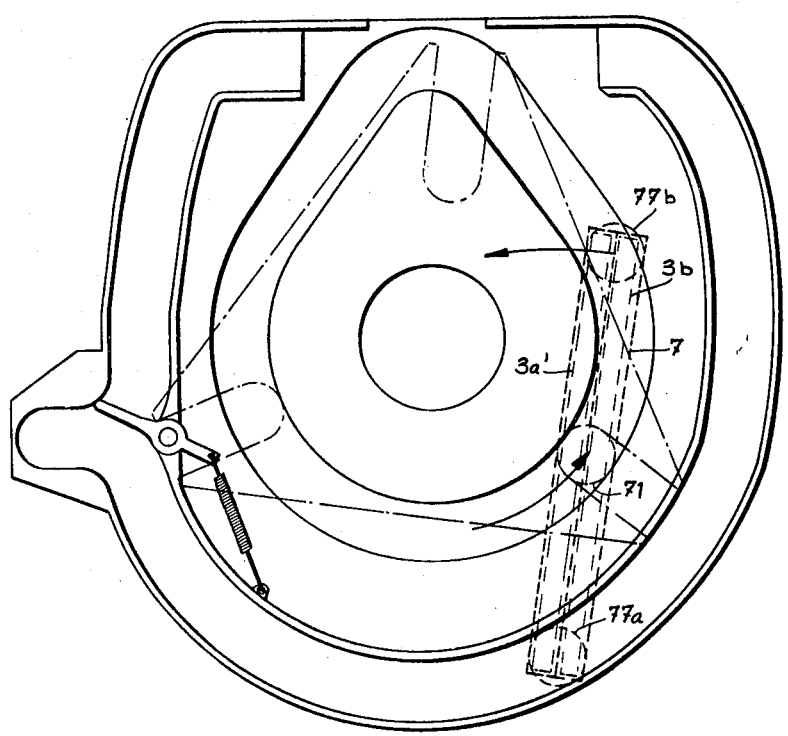
Figure 5E:
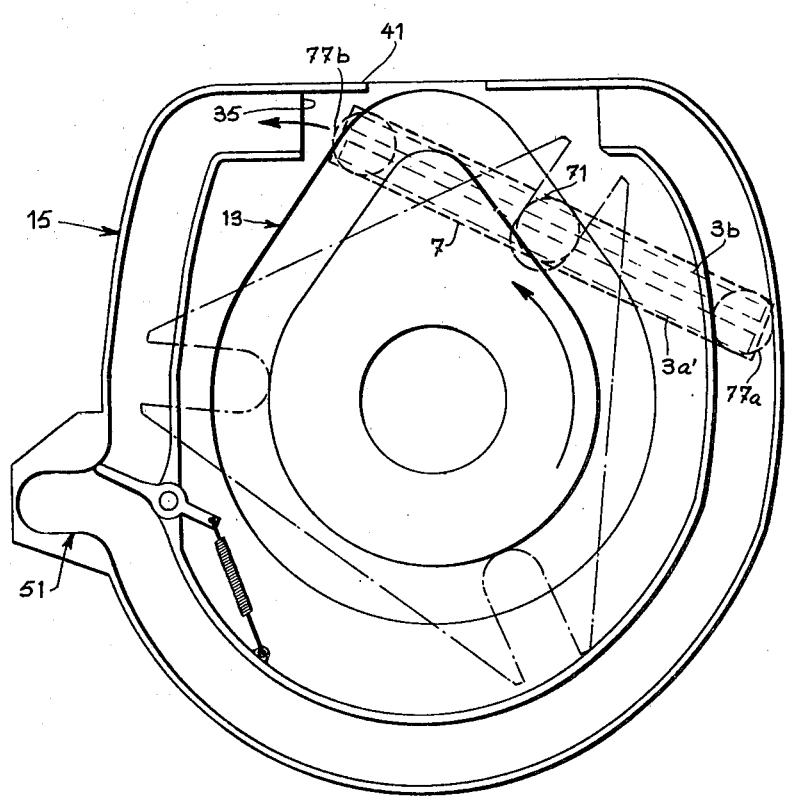

Dog plate 81 is then again rotated through another 120° to move holder 7 to a holding station just past that shown in FIG. 5d. Free roller 77b is now ahead of roller 77a. After a pause, dog plate 81 is rotated from the holding station through another 120° to return holder 7 to the picture taking position shown in FIG. 5a. As the holder 7 approaches this position, as shown in FIG. 5e, it is seen that free roller 77b still leads and enters the second guide path 15 through entry 35, guided into it by outer wall 41. Roller 77a, still trailing, remains constrained in the second guide path 15. It will be seen that holder 7 has been rotated through 180° about the axis of its rollers 71 during its travel in a closed loop. Film cassette 3b is now in position for a picture adjacent surface 5.

Another circuit of holder 7 through the first guide path 13 will present cassette 3a' for a picture. It will be understood that while one holder is at the picture taking station, another is at the leading station, and a third at the holding station as shown in FIG. 2. Each of the three holders move in sequence through the three stations.

I claim:

1. An apparatus for use in taking X-ray pictures, comprising:
    a plurality of X-ray film holders, each holder being adapted to hold two X-ray films in back-to-back relation;
    means for intermittently rotating the holders in a closed loop past a picture-taking station on the loop, each holder stopping at the station during the time a picture is taken and presenting one of its two films for a first picture as it first passes said station, and
    means for rotating each holder through 180° as it is moved through the closed loop after its first passage at the station, to present the other film it carries for a second picture at the picture-taking station during a second passage at said station.

2. An apparatus as claimed in claim 1 wherein said means for rotating the holders in a closed loop comprises:
    a first roller at each end of the holder, said first roller being located in the center of said holder end,
    first closed loop guide means mounted adjacent each end of the holders, said first guide means including the picture-taking station along its path, the first roller at each end of each holder riding in said first guide means,
    a dog plate mounted between each end of the holders and the first guide means, said dog plate having means for holding each first roller riding in the first guide means; and
    means for intermittently rotating the dog plates to rotate the holders via their first rollers while they are guided by the first guide means.

3. An apparatus as claimed in claim 2 wherein said means on each dog plate for holding each first roller consists of a short slot extending radially inwardly from the periphery of the plate towards its center of rotation, the said first roller being rotatably and slidably mounted in said slot.

4. An apparatus as claimed in claim 3 wherein said means for rotating each holder at 180° comprises:
    a second open loop guide means encircling the first guide means and spaced inwardly therefrom,
    second and third rollers on each end of the holder, each of said second and third rollers being adjacent a lateral edge of the holder, said second and third rollers alternatively riding in the second guide means during alternative loops of the holder except when the first roller of a holder is at the picture taking station on the first guide means, where both second and third rollers of the said holder are riding in the second guide means,
    a short branch guide means extending transversely from the second guide means to temporarily receive said second or third roller riding in said second guide means and thus to help rotate each holder about its own axis, and
    means for deflecting said second or third roller into the short branch guide means during its loop.

5. An apparatus as claimed in claim 4 further comprising a door adjacent the branch guide means for use in loading and unloading film onto the holders when one second or third roller of each holder is in the branch guide means.

* * * * *